Sept. 10, 1940.  W. A. BELCHER, JR  2,214,448
END CONNECTOR
Filed Jan. 3, 1939
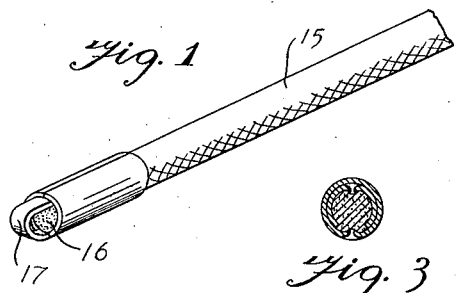
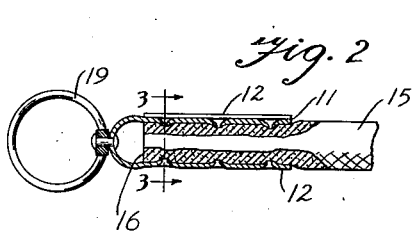
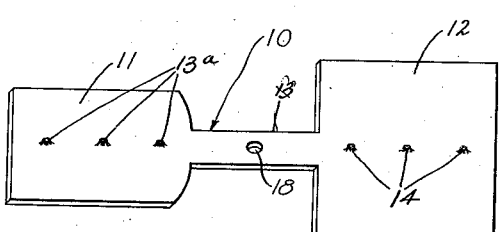
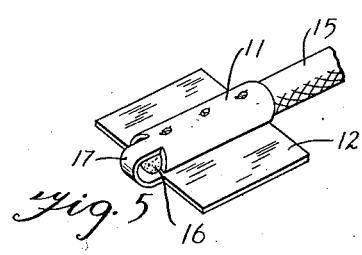
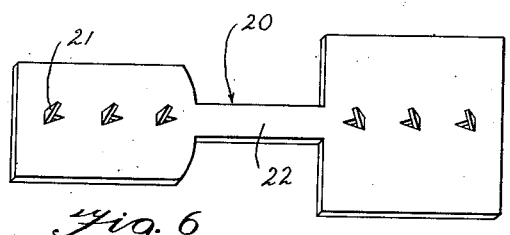
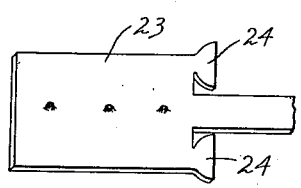
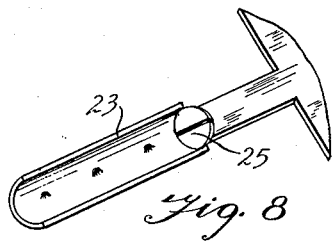
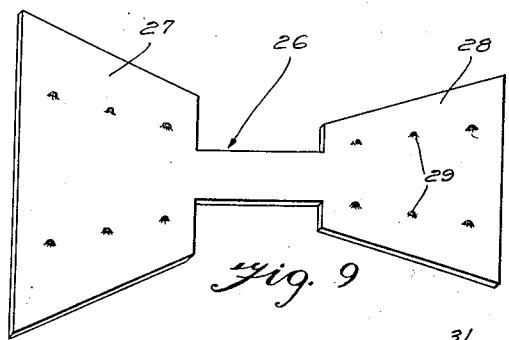
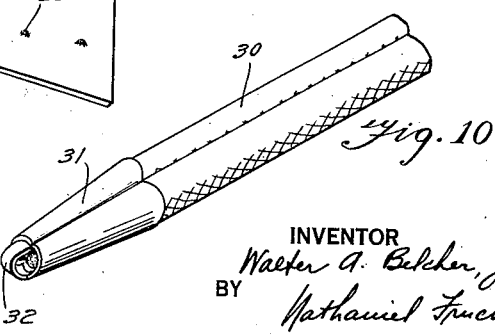
INVENTOR
Walter A. Belcher, Jr.
BY Nathaniel Frucht
ATTORNEY Patented Sept. 10, 1940

2,214,448

UNITED STATES PATENT OFFICE 2,214,448

END CONNECTOR

Walter A. Belcher, Jr., East Providence, R. I.

Application January 3, 1939, Serial No. 249,020

6 Claims. (Cl. 24—129)

My present invention relates to jewelry findings, and more particularly to an end connector for cords, straps, chains, cables or the like.

The principal object of the present invention is to provide an end connector which can readily be applied to cords, straps, chains, and the like, which can easily and economically be made in one integral piece from stamped sheet stock.

Another object of the present invention is to provide a device of the character specified, which can readily be attached to cords, straps, or chain ends without the use of special tools.

A further object of the present invention is to provide an end connector of simple construction which will afford a firm grip upon the ends of the cord, chains, or straps without the use of additional locking devices.

Another object of the present invention is to provide an end connector which can readily be utilized on various, different types of articles and materials, including cord lead wires and other electrical connections.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is an enlarged perspective view of a cord end equipped with an end connector embodying my invention;

Fig. 2 is a sectional view of my end connector, slightly modified, on a cord end;

Fig. 3 is a transverse section taken along line 3—3 of Fig. 2;

Fig. 4 is a plan view of the stamped sheet blank forming the end connector;

Fig. 5 is a perspective view of the end connector, partially assembled to a cord end;

Fig. 6 is a plan view of a modified form of blank for my end connector;

Fig. 7 is a plan view of another modified form;

Fig. 8 is a perspective view of the form shown in Fig. 7, partially assembled;

Fig. 9 is a plan view of a modified form of blank for a double cord;

Fig. 10 is a perspective view of a cord end utilizing the form shown in Fig. 9; and Fig. 11 is a perspective view of another modified form.

In the use of end connectors in various industries, it is desirable to provide an end connector which will effectively grip the end of a cord, strap, chain, cable, or the like, which will protect it from strain or ravelling, and which provide an additional means for clipping or attaching the cord or strap to other devices. The end connector of the present invention provides a device which will accomplish the above and which can be readily stamped out of inexpensive sheet stock and assembled without the use of special tools.

Referring to the drawing embodying the present invention, the blank 10, Fig. 4, may be readily stamped out of any suitable or desirable metal in sheet stock. The blank 10 comprises a rectangular portion 11 and a rectangular portion 12 connected by a narrow strip 13. Rectangular portions 11 and 12 are of identical length. However, the rectangular portion 12 is substantially wider than the rectangular portion 11. In stamping, portions 11 and 12 are provided with rows of openings 13a and 14 respectively which are punched through to provide sharply upturned edges, see Fig. 2.

For the purposes of illustration, the end connector is illustrated as being attached to a twisted fibre cord. In assembly, the cord 15 is placed on the rectangular portion 12, covering the extruded openings 14, the end of the cord 16 abutting the beginning of the narrow strip 13. As illustrated in Fig. 5, the rectangular portion 11 is now manually bent over the upper surface of the cord 15 and arcuately bent around it by means of any suitable instrument such as a pair of pliers. The narrow portion 13 forms a U-shaped loop 17 in this position. By the use of the same instrument, the rectangular portion 12 is now curved around the cord end 16, as in Fig. 1, so that the edges thereof overlap and press upon the upper surface of the portion 11. The pressure of the edge portion of the rectangular portion 12 will tend to draw the rectangular portion 12 tightly against the under surface of the cord end 16 and will press the sharp edges of the opening 14 into the cord ends to effectively grip the same (see Fig. 2). At the same time, it will squeeze the portion 11 tightly down against the upper part of the cord ends, will lock the same into the position shown in Figs. 1 and 2, and will force the edges of the openings 13a into the upper portion of the cord end. The loop 17, extending beyond the end 16 of the cord, provides integral means for attaching the cord ends to any suitable device. However, if a further attaching means is desired, an opening 18 may be stamped in the narrow portion 13 during the stamping process. As illustrated in Fig. 2, a swivel 19 may be inserted in this opening in the conventional manner.

The blank 10 can obviously be varied in size to accommodate different diameters of cord or strap ends, and may be made square, or any other preferred shape. As can readily be seen, the end connector above described can cheaply be stamped of cheap stock and can be assembled in the space of a few seconds by the use of a pair of pliers without the necessity of any special knowledge and skill.

Where relatively stiff or metallic chains are used, or if a firmer connection is desirable, the openings 13a and 14 may be replaced by struck-up lugs with sharp edges as shown in Fig. 6. In Fig. 6, the blank 20 is provided with struck-up lugs 21. The blank 20 is assembled identically with the blank 10 and the lugs 21 will dig firmly into the cord or strap end and form a firm anchor. If there is danger of the lug 21 severing the cord, the point of the lug may be struck up from a longitudinal direction so that they will lie edgewise in a plane with the strands of the cord.

The form shown in Fig. 6 may readily be adapted to be used as an end connector on an electrical cord connection without removing the insulation from the cable. The lug 21 may be made sufficiently long to pierce the insulation and form an electrical connection with the wire conductor. When used for this purpose, the narrow central portion 22 may be flattened, instead of in the shape of a loop for the purpose of attaching the same to an electrical cord lead wire.

If it is necessary to protect the end 16 of the cord, or to hide the same for purposes of appearance, the blank may be formed as shown in Fig. 7. In this form the rectangular portion 23, corresponding to the rectangular portion 11, may be provided at its right side edge with semicircular tabs 24, which will form a circular abutment 25, as shown in Fig. 8, effectively blocking off and protecting the end 16 of the cord.

If a double cord is desirable, the form shown in Figs. 9 and 10 may be used. The blank 26 is provided with portions 27 and 28 with tapered side edges. Each portion is also provided with two spaced rows of upturned edge openings 29. The cords are laid across the edges of the openings 29 and the blank is assembled as in the previous forms. The result, as shown in Fig. 10, produces a double cord 30 having a tapered end connector 31 and a single connecting loop 32.

For shoe laces and the like, where no loop is necessary, the form shown in Fig. 11 is used. The blank shown in Fig. 4 or Fig. 6 is modified by shortening the center bar so that after assembly it will not extend in a loop but merely form a closed end, as at 33, for the end of the cord.

Other uses and anchoring methods will be readily apparent to persons skilled in the art.

While I have described a specific constructional embodiment of my invention, it is obvious that the size of the blank, the position and shape of the blank, the fastening means, the materials used for the blank, and the particular construction and arrangement of the parts may be made to suit the requirements for different types of end connectors, without however departing from the spirit and the scope of the invention, as defined in the appended claims.

I claim:

1. An integral, one-piece, end connector comprising an inner curved portion adapted to receive and partially surround a cord end, and an outer portion adapted to overlap the inner portion and grippingly surround said cord end, whereby both portions are in gripping engagement with said cord end.

2. An integral, one-piece, end connector comprising an inner curved portion adapted to receive and partially surround a cord end, and an outer portion adapted to overlap the inner portion and grippingly surround said cord end, whereby both portions are in gripping engagement with said cord end, and an integral connecting loop extending from said portions.

3. An integral, one-piece, end connector comprising an inner curved portion adapted to receive and partially surround a cord end, and an outer portion adapted to overlap the inner portion and grippingly surround said cord end, whereby both portions are in gripping engagement with said cord end, said portions having struck-up gripping means adapted to be imbedded into said cord end.

4. An integral, one-piece, end connector comprising an inner curved portion adapted to receive and partially surround a cord end, and an outer portion adapted to overlap the inner portion and grippingly surround said cord end, whereby both portions are in gripping engagement with said cord end, said portions being connected by an integral center bar extending over the end of the cord.

5. An integral, one-piece, end connector comprising an inner curved portion adapted to receive and partially surround a cord end, and an outer portion adapted to overlap the inner portion and grippingly surround said cord end, whereby both portions are in gripping engagement with said cord end and an integral connecting loop extending from said portions, said portions being connected by an integral center bar extending over the end of the cord.

6. An integral, one-piece, end connector comprising an inner curved portion adapted to receive and partially surround a cord end, and an outer portion adapted to overlap the inner portion and grippingly surround said cord end, whereby both portions are in gripping engagement with said cord end, said portions having struck-up gripping means adapted to be imbedded into said cord end, said portions being connected by an integral center bar extending over the end of the cord.

WALTER A. BELCHER, Jr.